March 11, 1924.
J. A. MOXEY
RUNNING GEAR FOR TRAILERS
Filed Oct. 7, 1918
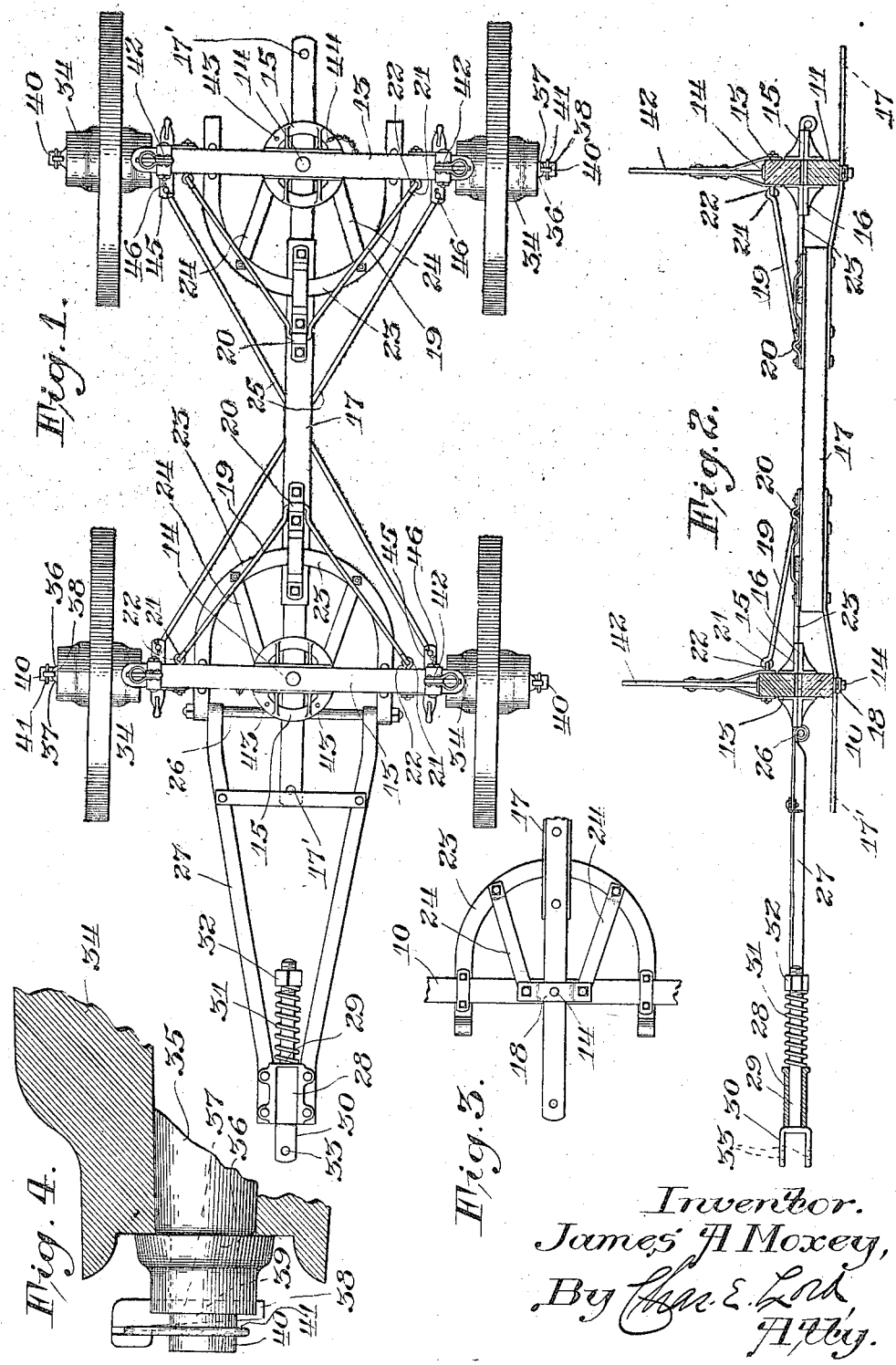
Inventor.
James A Moxey, Patented Mar. 11, 1924.

1,486,788

UNITED STATES PATENT OFFICE.

JAMES A. MOXEY, OF CHICAGO, ILLINOIS, ASSIGNOR, BY MESNE ASSIGNMENTS, TO INTERNATIONAL HARVESTER COMPANY, A CORPORATION OF NEW JERSEY.

RUNNING GEAR FOR TRAILERS.

Application filed October 7, 1918. Serial No. 257,121.

*To all whom it may concern:*

Be it known that I, JAMES A. MOXEY, a citizen of the United States, residing at Chicago, in the county of Cook and State of Illinois, have invented certain new and useful Improvements in Running Gears for Trailers, of which the following is a full, clear, and exact specification.

This invention relates to wagon running gear and more particularly to running gear for trailers.

The object of the invention is to provide a gear that is simple in construction and efficient in operation, and is, moreover, so constructed and arranged that the trailer having the improved gear may be pulled from either end.

A further object is to provide a construction which may be easily and quickly modified or changed so that the device having the improved gear embodied in its construction may be used either as a wagon or as a trailer.

With these objects in view the invention is embodied in a trailer having front and rear running gears made exactly alike, means being provided at each end for attaching a tongue or draft member and means being also provided for locking either axle against angular movement or against turning on its swivel or fifth wheel whereby the structure having the improved gear thereon may be used either as a wagon or as a trailer.

One embodiment of the invention is illustrated in the accompanying drawings and in these drawings—

Figure 1 shows a top plan view of the improved construction;

Fig. 2 is a longitudinal section of the construction shown in Fig. 1;

Fig. 3 is a bottom plan view showing the connections at the center of one of the axles; and Fig. 4 is an enlarged detail view showing in section a portion of one of the wheel hubs and the means for securing a hub to the skein of the axle.

In the embodiment of the invention illustrated, a trailer is shown having two axles, which, for convenience in describing the construction, will be termed front and rear axles, but as the description proceeds it will be evident that either axle may be used as the front or rear axle.

With this understanding of the construction attention is directed to Figures 1 and 2 where a front axle 10 and a rear axle 11 are shown. These axles support bolsters 13 and the bolsters are swiveled on the axles by means of king bolts 14 which extend through the center sections 15 and 16 of fifth wheels, the upper sections 15 being secured to the bolsters and the lower sections 16 being secured to the axles in any suitable manner. The axles are connected by means of a reach bar 17 which is pivotally secured to the axles by means of the bolts 14 and by means of straps 18, one of which is illustrated in Fig. 3. As illustrated in Figs. 1 and 2, the reach bar is extended the same distance beyond the axle at each end, the ends being apertured as shown at 17' to receive a stub tongue whereby the trailer may be secured to an adjacent trailer or vehicle. The reach bar is secured to the bolsters 13 by means of the V-shaped brace members 19, the central portions of these brace members being secured to the reach bar by straps 20 and the outer portions being secured to the bolsters by means of eyes 21 which are passed into eyes 22 carried by the bolsters. Hounds 23 are secured to the axles 10 and 11 by means of U-shaped bolts in the usual manner, the hounds passing through looped portions of the straps 20 carried by the reach bar. Braces 24 are also secured between the hounds and the axle as illustrated in Fig. 3.

To facilitate the turning of the vehicle when the device is used as a trailer, cross rods 25 are secured to the opposite ends of the front and rear axles as clearly illustrated in Fig. 1. The outer ends of the hounds are doubled upon themselves to form loops which are adapted to receive a cross rod 26 which in turn receives the rear end of a coupler or draft member 27. The front end of the coupler illustrated in the drawings is provided with a longitudinal bearing portion 28 which receives the shank portion 29 of a coupling member 30, a spring 31 being carried by the rear end of the shank 29 and being secured between the rear end of the bearing portion 28 and a nut 32 carried at the rear end of the shank. The front portion 30 of the coupling member is bifurcated as illustrated in Fig. 2 and is provided with registering apertures 33 which are adapted to receive a pin whereby the coupling member may be secured to the rear end of the vehicle or tractor adjacent thereto, and whereby a train of trailers may be formed by coupling the front portion of draft member 27 to the extended end of the reach bar of a preceding trailer.

As the trailer illustrated may be drawn from either end, means has been provided for securing the wheels to the axles in such a manner that their rotation in either direction will not tend to loosen them or loosen the means by which they are secured to the axles. In Fig. 4, one form of securing means is illustrated, the hub 34 being shown as mounted on a skein 35 of one of the axles, a securing member 36 being carried at the outer end of the skein and having on its outer portion a transverse slot 37. The slot 37 receives a locking key 38 which is wedge-shaped and passes through a suitable slot 39 formed in the outer end of the portion 40 of the skein. A ring 41 is pivotally carried by the locking key 38 and passes over the portion 40 of the skein, thereby securing the key against accidental removal. Standards 42 of any suitable construction may be secured to the bolster 13.

When the device is to be used as a wagon, the axle at one end thereof should be locked against relative angular movement with respect to the line of draft or with respect to the reach bar. In order to provide for so locking either axle, the upper and lower sections 15 and 16 of the fifth wheels are provided with registering apertures 43. When it is desired to lock one of the axles, a pin of any suitable construction, such for instance, as the pin illustrated at 44 in Figure 1, may be passed through the registering apertures, thereby locking the upper and lower sections of the fifth wheel against relative movement. It will be of course understood that when the device is to be used as a wagon the cross rods 25 are removed, and in order to provide for their ready removal, the rods are secured to brackets 45 carried by the axles by means of cotter pins 46.

From the above description it will be seen that a very simple construction has been devised, the running gear for the front and rear ends of the trailer being exactly the same, whereby the trailer may be propelled from either end. In addition to this feature simple means has been provided for locking either of the axles against angular movement when it is desired to use the device as a wagon instead of as a trailer.

While I have in the above specification described one embodiment which my invention may assume, it should be understood that the invention is capable of modification, and that modifications may be employed without departing from the spirit and scope of the invention as expressed by the following claims.

What I claim as new is:

1. A double ended trailer having duplicate running gears comprising the combination of a pair of wheeled axles, a reach bar connected to the axles and extended equal distances beyond them at each end, hounds connected to the axles and having arms the ends of which project beyond the axles, means on the ends of the reach bar and on the arms of the hounds for reception of draft connections, means connecting the axles for joint movement, and a draft member comprising a pair of forwardly converging bars coupled at one end to the arms of one of the hounds and provided with coupling means mounted between their forward ends adapted for connection to the reach bar of another trailer.

2. A double ended trailer having duplicate running gears comprising the combination of a pair of wheeled axles, a reach bar pivotally connected to each axle and extended equal distances beyond them at each end, crossed connecting bars connected to the axles, U-shaped hounds fixed to the axles and slidably connected to the reach bar and having arms extended beyond the axles a shorter distance than the ends of the reach bar and provided with transverse openings in their ends, a draft member comprising a pair of bars formed with openings registering with those in the arms of the hounds and having coupling means adapted for connection to the end of a reach bar on another trailer, and a coupling rod extending through the openings in the arms of one of the hounds and the bars of the draft member.

3. In running gear for trailers, an axle, a reach bar extending forward of the axle below the same and formed with an apertured end, said reach bar being pivotally connected to the axle, a U-shaped hound fixed to the axle and having its bight portion slidably connected to the reach bar and the ends of its arms extended forward of the axle parallel to each other and to the reach bar and formed with looped ends in proximity to the axle, a bolster carried by the axle, a fifth wheel connecting the axle and bolster and a V-shaped brace rod with its arms connected to the bolster and its angle connected to the reach bar.

In testimony whereof I affix my signature.

JAMES A. MOXEY.